United States Patent
Panche et al.

(10) Patent No.: US 9,465,654 B2
(45) Date of Patent: Oct. 11, 2016

(54) INTELLIGENT FAILOVER OR SHUTDOWN OF AN APPLICATION USING INPUT/OUTPUT SHIPPING IN RESPONSE TO LOSS OF CONNECTIVITY TO DATA STORAGE IN A CLUSTER

(75) Inventors: Mangesh Panche, Maharashtra (IN); Nitin Wankhede, Maharashtra (IN); Niranjan Pendharkar, Maharashtra (IN); Asmita Jagtap, Maharashtra (IN); Shailesh Marathe, Maharashtra (IN); Sumit Sharma, Maharashtra (IN)

(73) Assignee: VERITAS TECHNOLOGIES LLC, Mountain View, CA (US)

( * ) Notice: Subject to any disclaimer, the term of this patent is extended or adjusted under 35 U.S.C. 154(b) by 323 days.

(21) Appl. No.: 13/368,244

(22) Filed: Feb. 7, 2012

(65) Prior Publication Data

US 2013/0205006 A1     Aug. 8, 2013

(51) Int. Cl.
*G06F 9/48*     (2006.01)
*H04L 12/24*    (2006.01)
*H04L 12/26*    (2006.01)

(52) U.S. Cl.
CPC ........... *G06F 9/485* (2013.01); *H04L 41/0668* (2013.01); *H04L 43/0811* (2013.01)

(58) Field of Classification Search
CPC ................ G06F 15/173; G06F 11/20; H04L 29/08072; H04L 29/06
USPC ........................ 709/201, 224; 714/6.21, 4.11
See application file for complete search history.

(56) References Cited

U.S. PATENT DOCUMENTS

| | | | |
|---|---|---|---|
| 6,594,784 B1 * | 7/2003 | Harper et al. | 714/47.2 |
| 6,683,850 B1 * | 1/2004 | Dunning et al. | 370/231 |
| 2003/0033412 A1 * | 2/2003 | Sundaresan et al. | 709/227 |
| 2004/0059805 A1 * | 3/2004 | Dinker et al. | 709/223 |
| 2011/0145631 A1 * | 6/2011 | Shankar et al. | 714/4.11 |
| 2013/0007216 A1 * | 1/2013 | Fries et al. | 709/218 |
| 2013/0198562 A1 * | 8/2013 | Anthonisamy et al. | 714/6.21 |

* cited by examiner

*Primary Examiner* — Vivek Srivastava
*Assistant Examiner* — Hien Doan
(74) *Attorney, Agent, or Firm* — Wilmer Cutler Pickering Hale and Dorr LLP

(57) ABSTRACT

When a loss of connectivity between a first node in a cluster of nodes and a data store is detected, an input/output (I/O) request associated with an application that was executing on the first node is shipped to a second node in the cluster that is in communication with the data store. The application can be gracefully shut down on the first node, and the second node can execute the application and satisfy the I/O request.

20 Claims, 7 Drawing Sheets

INTELLIGENT FAILOVER OR SHUTDOWN OF AN APPLICATION USING INPUT/OUTPUT SHIPPING IN RESPONSE TO LOSS OF CONNECTIVITY TO DATA STORAGE IN A CLUSTER

BACKGROUND

In a distributed file storage system, servers may be organized as one or more clusters of cooperating nodes. In one type of cluster organization, called "shared data clustering," the nodes of a cluster (each of which may correspond to a separate physical server) share access to data storage devices. For example, the shared data storage devices may be accessible to each node of a cluster over a storage area network (SAN) implemented using a combination of Fibre Channel over Ethernet (FCoE) and other storage interconnects such as various forms of SCSI (Small Computer System Interface) including iSCSI (Internet SCSI) and other Internet Protocol-based (IP-based) storage protocols.

Typically, an application executing on a particular node (server) accesses a data store for the data it needs. The data store may be distributed over a number of physical storage devices. In the event connectivity is lost between that node and the data store, the node can reestablish connectivity to the data store via another node in the cluster. That is, the first node (on which the application is executing) communicates an input/output (I/O) request to a second node in the cluster, and the second node accesses the data store and returns the data to the first node and thus to the application executing on the first node. This technique is referred to as "I/O shipping."

However, the conventional approach can be problematic for a number of reasons. For example, overall performance can be degraded because of the additional time needed to access data via the second node—the time needed to satisfy the I/O request is increased because the path of the I/O lengthened. Furthermore, when the first node loses connectivity to the data store, the cluster software may "panic" the node, causing the node to abruptly abort execution of the application. Consequently, when connectivity to the data store is reestablished, it may be necessary to recover the data and the application before continuing execution. The recovery process takes time to complete, resulting in a blackout period during which access to the application is limited or denied. The recovery process may take even longer to complete if it is necessary to scan multiple physical storage devices.

SUMMARY

In one embodiment, a first node (e.g., a server) in a cluster is executing an application using data accessed from a data store but detects a loss of connectivity with the data store. In that event, I/O requests associated with the application on the first node are handled through a second node using I/O shipping. At a suitable point, the application on the first node can be made to stop issuing I/O requests and execution of the application on the first node can be gracefully shut down. The second node can execute the application and satisfy subsequent I/O requests. If connectivity between the first node and the data store is restored, execution of the application can be returned to the first node.

In one embodiment, to select the second node, connectivity status information for the nodes in the cluster is monitored. The second node is intelligently selected based on the connectivity status information. That is, the second node is selected because the status information identifies that the second node is able to access the data store.

In one embodiment, a cluster manager executed by cluster software is notified that connectivity between the first node and the data store is lost and that the I/O request is being shipped to the second node.

In an embodiment in which the application is executed in parallel on the first node and the second node, the application is shut down on the first node and execution continues on the second node (and perhaps on other nodes as well). In another embodiment, the application is failed over from the first node to the second node. In either situation, the application can be gracefully shut down on the first node.

In one embodiment, the application is a virtual machine. In response to detecting a loss of connectivity, the cluster manager can migrate the virtual machine using a virtual machine migration technique provided by the virtualization technology.

In summary, by using I/O shipping when a node (e.g., server) loses access to the data needed for an application, the application can be gracefully closed on the affected node and executed on another node, thus avoiding the need to recover the application and/or data and reducing blackout time. Furthermore, the effect of the loss of connectivity on overall performance is reduced because the executing node can communicate directly with the data store, reducing the time needed to access the data store relative to conventional approaches.

These and other objects and advantages of the various embodiments of the present disclosure will be recognized by those of ordinary skill in the art after reading the following detailed description of the embodiments that are illustrated in the various drawing figures.

BRIEF DESCRIPTION OF THE DRAWINGS

The accompanying drawings, which are incorporated in and form a part of this specification and in which like numerals depict like elements, illustrate embodiments of the present disclosure and, together with the description, serve to explain the principles of the disclosure.

DETAILED DESCRIPTION

Figure 1:
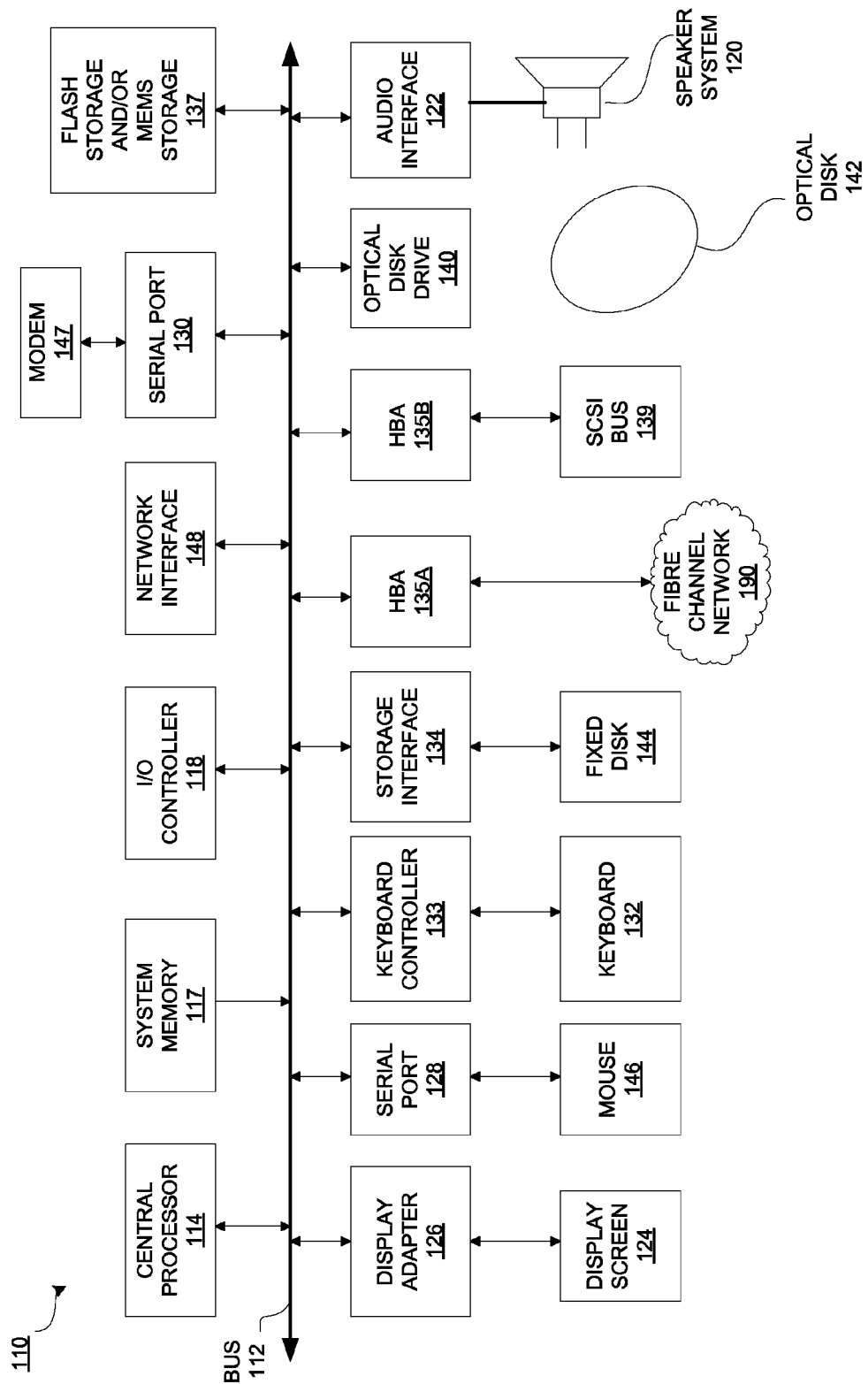
FIG. 1 is a block diagram of an example of a computing system capable of implementing embodiments according to the present disclosure.

Reference will now be made in detail to the various embodiments of the present disclosure, examples of which are illustrated in the accompanying drawings. While described in conjunction with these embodiments, it will be understood that they are not intended to limit the disclosure to these embodiments. On the contrary, the disclosure is intended to cover alternatives, modifications and equivalents, which may be included within the spirit and scope of the disclosure as defined by the appended claims. Furthermore, in the following detailed description of the present disclosure, numerous specific details are set forth in order to provide a thorough understanding of the present disclosure. However, it will be understood that the present disclosure may be practiced without these specific details. In other instances, well-known methods, procedures, components, and circuits have not been described in detail so as not to unnecessarily obscure aspects of the present disclosure.

Some portions of the detailed descriptions that follow are presented in terms of procedures, logic blocks, processing, and other symbolic representations of operations on data bits within a computer memory. These descriptions and representations are the means used by those skilled in the data processing arts to most effectively convey the substance of their work to others skilled in the art. In the present application, a procedure, logic block, process, or the like, is conceived to be a self-consistent sequence of steps or instructions leading to a desired result. The steps are those utilizing physical manipulations of physical quantities. Usually, although not necessarily, these quantities take the form of electrical or magnetic signals capable of being stored, transferred, combined, compared, and otherwise manipulated in a computer system. It has proven convenient at times, principally for reasons of common usage, to refer to these signals as transactions, bits, values, elements, symbols, characters, samples, pixels, or the like.

It should be borne in mind, however, that all of these and similar terms are to be associated with the appropriate physical quantities and are merely convenient labels applied to these quantities. Unless specifically stated otherwise as apparent from the following discussions, it is appreciated that throughout the present disclosure, discussions utilizing terms such as "detecting," "executing," "accessing," "receiving," "shipping," "transferring," "shutting down," "starting," "failing over," "returning execution," "monitoring," "selecting," "issuing," "sending," or the like, refer to actions and processes (e.g., flowchart 800 of FIG. 8) of a computer system or similar electronic computing device or processor (e.g., system 110 of FIG. 1). The computer system or similar electronic computing device manipulates and transforms data represented as physical (electronic) quantities within the computer system memories, registers or other such information storage, transmission or display devices.

Embodiments described herein may be discussed in the general context of computer-executable instructions residing on some form of computer-readable storage medium, such as program modules, executed by one or more computers or other devices. By way of example, and not limitation, computer-readable storage media may comprise non-transitory computer storage media and communication media. Generally, program modules include routines, programs, objects, components, data structures, etc., that perform particular tasks or implement particular abstract data types. The functionality of the program modules may be combined or distributed as desired in various embodiments.

Computer storage media includes volatile and nonvolatile, removable and non-removable media implemented in any method or technology for storage of information such as computer-readable instructions, data structures, program modules or other data. Computer storage media includes, but is not limited to, random access memory (RAM), read only memory (ROM), electrically erasable programmable ROM (EEPROM), flash memory or other memory technology, compact disk ROM (CD-ROM), digital versatile disks (DVDs) or other optical storage, magnetic cassettes, magnetic tape, magnetic disk storage or other magnetic storage devices, or any other medium that can be used to store the desired information and that can accessed to retrieve that information.

Communication media can embody computer-executable instructions, data structures, and program modules, and includes any information delivery media. By way of example, and not limitation, communication media includes wired media such as a wired network or direct-wired connection, and wireless media such as acoustic, radio frequency (RF), infrared and other wireless media. Combinations of any of the above can also be included within the scope of computer-readable media.

FIG. 1 depicts a block diagram of a computer system 110 suitable for implementing the present disclosure. In the discussion to follow, various and numerous components and elements are described. Various combinations and subsets of those components can be used to implement the devices mentioned in conjunction with FIG. 1. For example, the nodes 240 and 245 (FIG. 2) may each be a full-function computer system that employs many if not all of the features of the computer system 110, or they may utilize only the subset of those features needed to support the functionality provided by those devices. For example, servers may not need a keyboard or display, and may execute a relatively sparse operating system that supports the functionality of data storage and data access and the management of such functionality.

In the example of FIG. 1, the computer system 110 includes a bus 112 which interconnects major subsystems of the computer system. These subsystems include a central processor 114; a system memory 117; an input/output controller 118; an external audio device, such as a speaker system 120 and an audio output interface 122; an external device, such as a display screen 124 and a display adapter 126; serial ports 128 and 130; a keyboard 132 (interfaced with a keyboard controller 133); a storage interface 134; a floppy disk drive 137 operative to receive a floppy disk 138; a host bus adapter (HBA) interface card 135A operative to connect with a Fibre Channel network 190; an HBA interface card 135B operative to connect to a SCSI bus 139 (alternatives to SCSI include Integrated Development Environment (IDE) and Serial Advanced Technology Attachment (SATA)); and an optical disk drive 140 operative to receive an optical disk 142. Also included are a mouse 146 (or other point-and-click device, coupled to the bus 112 via the serial port 128); a modem 147 (coupled to the bus 112 via the serial port 130); and a network interface 148 (coupled directly to the bus 112). The modem 147, network interface 148, or some other method can be used to provide connectivity to the network 250 of FIG. 2.

The bus 112 of FIG. 1 allows data communication between the central processor 114 and system memory 117, which may include ROM or flash memory and RAM (not shown), as previously noted. The RAM is generally the main memory into which the operating system and application programs are loaded. The ROM or flash memory can contain, among other code, the Basic Input-Output System (BIOS), which controls basic hardware operation such as the interaction with peripheral components.

Applications resident in the computer system 110 are generally stored on and accessed via a computer-readable storage medium, such as a hard disk drive (e.g., the fixed disk 144), an optical drive (e.g., the optical drive 140), a floppy disk unit 137, or other storage medium. Applications can be in the form of electronic signals modulated in accordance with the application and data communication technology when accessed via the network modem 147 or the interface 148.

Continuing with reference to FIG. 1, storage interface 134, as with the other storage interfaces of computer system 110, can connect to a standard computer-readable storage medium for storage and/or retrieval of information, such as a fixed disk drive 144. The fixed disk drive 144 may be a part of the computer system 110, or it may be separate and accessed through other interface systems. The modem 147 may provide a direct connection to a remote server via a telephone link or to the Internet via an internet service provider (ISP). The network interface 148 may provide a direct connection to a remote server via a direct network link to the Internet via a POP (point of presence). The network interface 148 may provide such a connection using wireless techniques, including digital cellular telephone connection, Cellular Digital Packet Data (CDPD) connection, digital satellite data connection, or the like.

Many other devices or subsystems (not shown in FIG. 1) may be connected in a similar manner (e.g., document scanners, digital cameras and so on). Conversely, all of the devices shown in FIG. 1 need not be present to practice the present disclosure. The devices and subsystems can be interconnected in different ways from that shown in FIG. 1.

The operation of a computer system such as that shown in FIG. 1 is readily known in the art and is not discussed in detail in this application. Code to implement the present disclosure can be stored in computer-readable storage media such as one or more of the system memory 117, fixed disk 144, optical disk 142, or floppy disk 138. The operating system provided on the computer system 110 may be MS-DOS®, MS-WINDOWS®, OS/2®, UNIX®, Linux®, or another known operating system.

Figure 2:
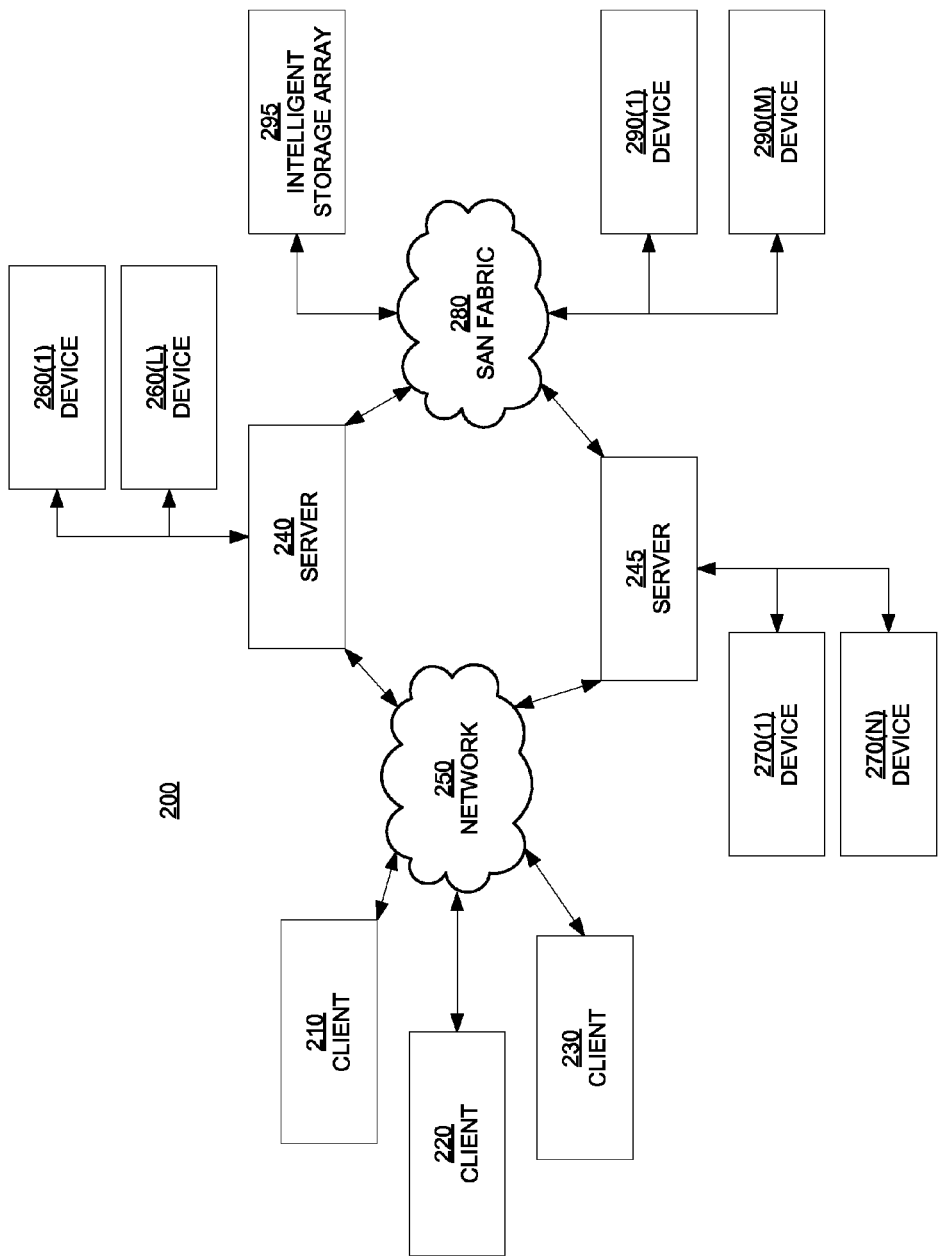
FIG. 2 is a block diagram of an example of a network architecture capable of implementing embodiments according to the present disclosure.

FIG. 2 is a block diagram of an example of a network architecture 200 in which client systems 210, 220, and 230 and servers 240 and 245 may be coupled to a network 250. The client systems 210, 220, and 230 generally represent any type or form of computing device or system, such as the computing system 110 of FIG. 1.

Similarly, the servers 240 and 245 generally represent computing devices or systems, such as application servers or database servers, configured to provide various database services and/or run certain software applications. The servers 240 and 245 may be individually referred to herein as nodes and collectively they may be referred to as a cluster.

The network 250 generally represents any telecommunication or computer network including, for example, an intranet, a wide area network (WAN), a local area network (LAN), a personal area network (PAN), or the Internet.

As illustrated in FIG. 2, one or more storage devices 260(1)-(L) may be directly attached to the server 240. Similarly, one or more storage devices 270(1)-(N) may be directly attached to the server 245. The storage devices 260(1)-(L) and storage devices 270(1)-(N) generally represent any type or form of storage device or medium capable of storing data and/or other computer-readable instructions. The storage devices 260(1)-(L) and storage devices 270(1)-(N) may represent network-attached storage (NAS) devices configured to communicate with the servers 240 and 245 using various protocols, such as Network File System (NFS), Server Message Block (SMB), or Common Internet File System (CIFS).

The servers 240 and 245 may also be connected to a storage area network (SAN) fabric 280. The SAN fabric 280 generally represents any type or form of computer network or architecture capable of facilitating communication between storage devices. The SAN fabric 280 may facilitate communication between the servers 240 and 245 and the storage devices 290(1)-(M) and/or an intelligent storage array 295. The SAN fabric 280 may also facilitate, via the network 250 and the servers 240 and 245, communication between the client systems 210, 220, and 230 and the storage devices 290(1)-(M) and/or intelligent storage array 295 in such a manner that the devices 290(1)-(M) and the array 295 appear as locally attached devices to the client systems 210, 220, and 230. As with the storage devices 260(1)-(L) and the storage devices 270(1)-(N), the storage devices 290(1)-(M) and the intelligent storage array 295 generally represent any type or form of storage device or medium capable of storing data and/or other computer-readable instructions.

With reference to the computing system 110 of FIG. 1, a communication interface, such as the network interface 148, may be used to provide connectivity between each client system 210, 220, and 230 and the network 250. The client systems 210, 220, and 230 may be able to access information on the server 240 or 245 using, for example, a Web browser or other client software. Such software may allow the client systems 210, 220, and 230 to access data hosted by the server 240, server 245, storage devices 260(1)-(L), storage devices 270(1)-(N), storage devices 290(1)-(M), or intelligent storage array 295. Although FIG. 2 depicts the use of a network (such as the Internet) for exchanging data, the embodiments described herein are not limited to the Internet or any particular network-based environment.

Returning to FIG. 2, in one embodiment, all or a portion of one or more of the example embodiments disclosed herein are encoded as a computer program and loaded onto and executed by the server 240, server 245, storage devices 260(1)-(L), storage devices 270(1)-(N), storage devices 290(1)-(M), intelligent storage array 295, or any combination thereof. All or a portion of one or more of the example embodiments disclosed herein may also be encoded as a computer program, stored in the server 240, run by the server 245, and distributed to the client systems 210, 220, and 230 over the network 250. Accordingly, the network architecture 200 may perform and/or be a means for performing, either alone or in combination with other elements, one or more of the operations disclosed herein. The network architecture 200 may also be used to perform and/or be a means for performing other operations and features set forth in the instant disclosure.

Using I/O Shipping in Response to Loss of Connectivity to Data Storage

Figure 3:
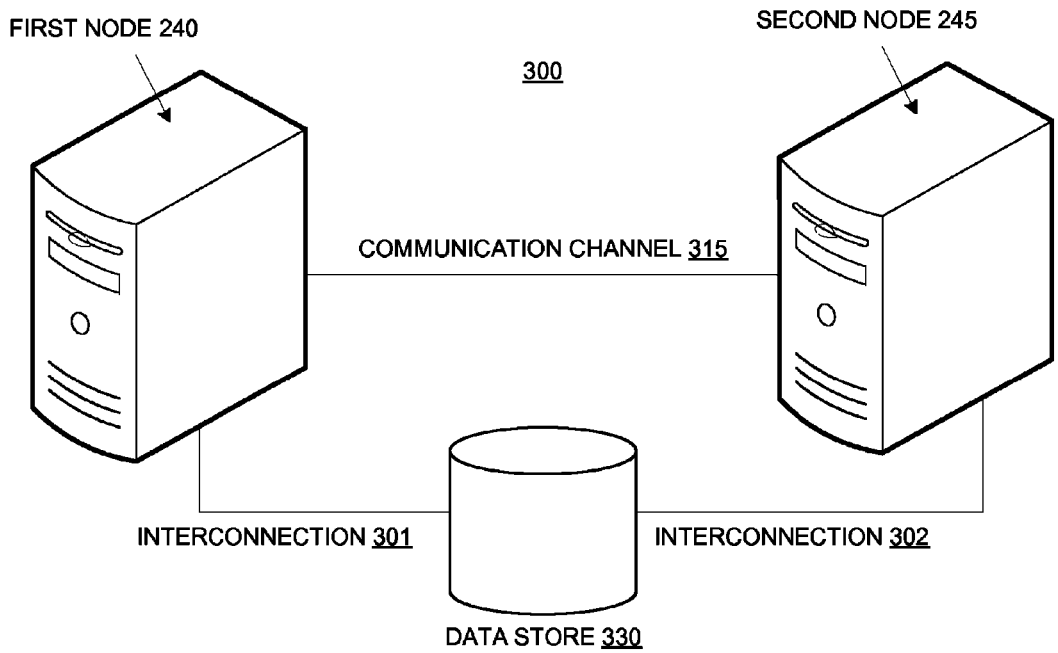
FIG. 3 is a block diagram of a cluster in an embodiment according to the present disclosure.

FIG. 3 is a block diagram of a cluster 300 in an embodiment according to the present disclosure. In the example of FIG. 3, the cluster 300 includes nodes (e.g., servers) 240 and 245. The node 240 may be referred to herein as the first node, and the node 245 may be referred to herein as the second node. A cluster may include more than two nodes, and the present disclosure is not limited to a maximum number of nodes in a cluster.

The nodes 240 and 245 are connected via a cluster network communication channel 315, which may include redundant channels (separate connections). The first node 240 shares a data storage system (data store) 330 with the second node 245. The first node 240 is interconnected with the data store 330 via the storage interconnection 301, and the second node 245 is interconnected with the data store 330 via the storage interconnection 302.

The data store 330 is shown as a local storage resource, although storage for a particular cluster may be accessed via a network. For example, the data store 330 may include a storage resource managed by a storage server (not shown) on a storage area network (see FIG. 2). The data store 330 may include intelligent and/or non-intelligent storage arrays. The data store 330 may include physical storage devices such as an array of physical disks, LUNs (SCSI logical units), or other types of hardware that are used to store data. A volume manager on each of the nodes 240 and 245 (see FIG. 4) overcomes restrictions associated with the physical storage devices by providing a logical volume management layer (a volume manager) that allows data to be spread across multiple physical disks within a disk array (not shown) in a manner that is transparent to the operating system and the file system.

Figure 4:
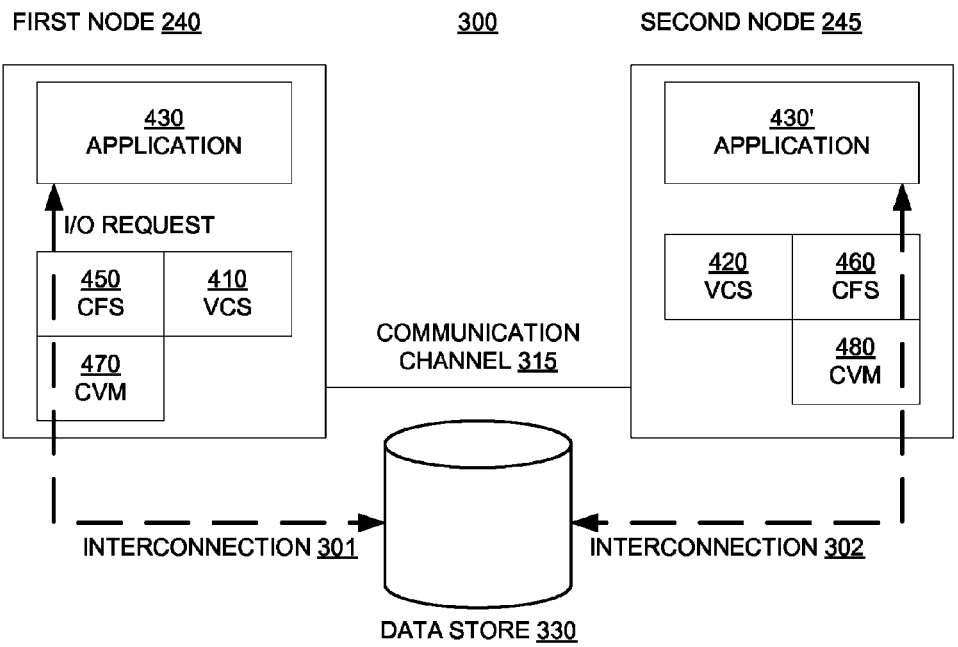
FIG. 4 is a block diagram of a clustering platform in an embodiment according to the present disclosure.

FIG. 4 is a block diagram of a clustering platform in an embodiment according to the present disclosure. As described above, the nodes 240 and 245 form a cluster 300, share the data store 330, and communicate via a cluster network communication channel 315.

The term "cluster software" is used herein in a general and broad sense to refer to a computer-implemented entity capable of performing the functions described below and attributed to that entity. To achieve high availability, the cluster software can be used to monitor the statuses of the applications and the nodes, and to automatically move execution of the applications from one system to another in response to a planned or unplanned event. In the example of FIG. 4, the cluster software includes agents that run on the nodes, can monitor the applications running on each node, and can trigger operations associated with starting, stopping, and moving execution of applications that are monitored and controlled by the cluster software.

In one embodiment, the cluster software includes cluster volume managers (CVMs) 470 and 480, cluster file systems (CFSs) 450 and 460, and cluster managers (VCSs) 410 and 420 that can communicate via the cluster network communication channel 315 to coordinate operation of the cluster. In one embodiment, commercially available software (e.g., VERITAS Cluster Server™) performs the functions described herein as operations of the cluster managers 410 and 420. However, embodiments according to the present disclosure are not so limited.

In the example of FIG. 4, the application 430 (430') may be any type of application. In one embodiment, the application 430 (430') can be any database application for managing databases, such as but not limited to ORACLE DATABASE, a SQL (Structured Query Language) server, IBM DB2, or SYBASE.

As mentioned above, the data store 330 may include physical storage devices such as an array of physical disks, LUNs (SCSI logical units), or other types of hardware that are used to store data. In the present embodiment, the CVMs 470 and 480 overcome restrictions associated with the physical storage devices by providing a logical volume management layer that allows data to be spread across multiple physical disks within a disk array in a manner that is transparent to the operating system.

The cluster software can perform other functions such as, but not limited to, sending and receiving heartbeats between nodes, monitoring and transporting traffic between nodes in the cluster 300, maintaining a list of cluster members (e.g., based on the heartbeats), and broadcasting configuration and status messages and updates to all nodes in the cluster 300.

In the example of FIG. 4, the first node 240 can execute the application 430. Data for the application 430 can be read from and written to the data store 330 via the storage interconnection 301.

In embodiments according to the present disclosure, should there be loss of connectivity between the first node 240 and the data store 330, I/O requests associated with the application 430 can be shipped to the second node 245 using a technique known as I/O shipping. Using I/O shipping, the second node 245 can access the data store 330 and satisfy the I/O request. As will be described further below, at a suitable point during execution, the application 430 can be gracefully shut down on the first node 240 and started up on the second node 245. That is, upon loss of connectivity to the data store 330, I/O requests associated with the application 430 are shipped to the second node 245 until, in one embodiment, the application can be gracefully terminated on the first node, at which point execution of the application can begin or continues on the second node. Because the application 430 can be gracefully closed on the first node 240, the need to recover the application and/or its data is avoided, thus reducing blackout time. Furthermore, the effect of the loss of connectivity on overall performance is reduced because, once the second node 245 begins executing the application 430, the node 245 can communicate directly with the data store 330.

In one embodiment, a cluster manager (e.g., the VCS 410) is notified that the first node is shipping the I/O request, and the type of action taken by the cluster manager in response depends on the policy in place. Different types of policies are possible, and the policy that is implemented for one application may be different than the policy implemented for another application. One policy includes performing the actions described above and below immediately in response to the notification that the I/O request is being shipped due to loss of connectivity. Another policy includes delaying such actions until after a time-based threshold is reached—in other words, a certain amount of time needs to pass before the application is shut down on the node 240. Yet another policy includes not taking any action in response to the notification—the application may be tolerant to I/O shipping, and so it may be acceptable to continue I/O shipping rather than shut down the application on the node 240.

Figure 5A:
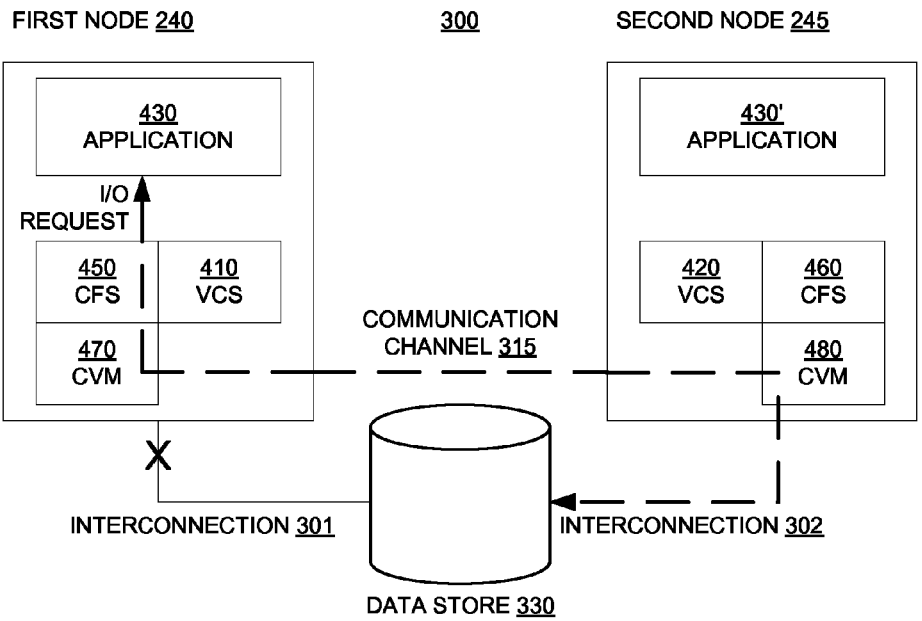
FIGS. 5A and 5B are block diagrams illustrating a response to loss of data store connectivity in an embodiment according to the present disclosure.
Figure 5B:
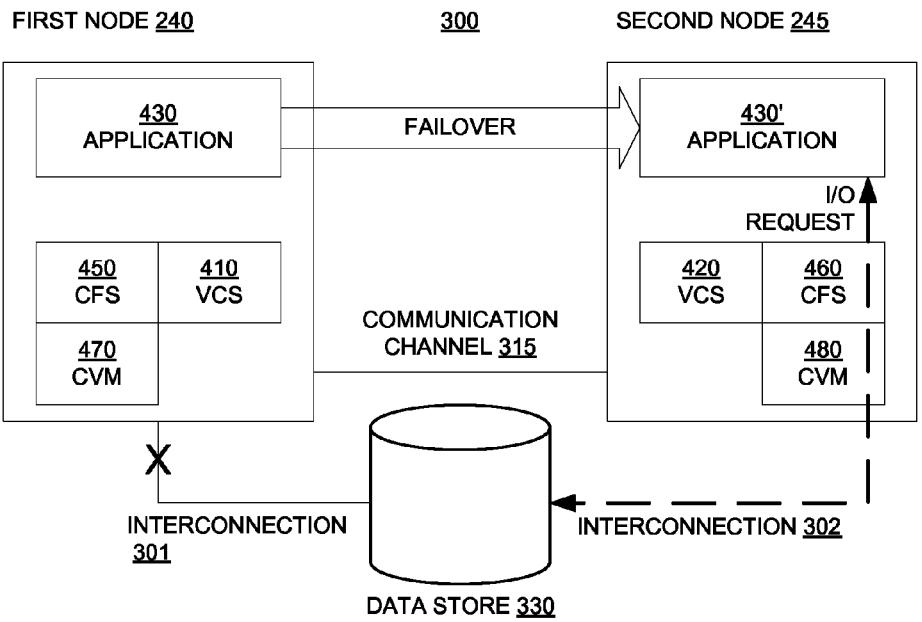

FIGS. 5A and 5B are block diagrams illustrating the technique described in conjunction with FIG. 4 in an implementation in which the application 430 fails over to the second node 245. Initially, the application 430 is executing on the first node 240 as shown in FIG. 4. Connectivity between the first node 240 and the data store 330 allows I/O requests associated with the application 430 to be directly satisfied via the storage interconnection 301.

In the embodiment of FIG. 5A, connectivity to the data store 330 is lost. Consequently, I/O shipping starts—any I/O requests are shipped (transferred) to the second node 245 (e.g., via the CVMs 470 and 480), and the I/O requests are satisfied via the storage interconnection 302. Also, the cluster software is notified (e.g., by the CVM 470 to the VCS 410) about the loss of connectivity.

In the embodiment of FIG. 5B, using the failover policy in place, execution of the application 430 on the first node 240 is stopped (e.g., by the cluster manager 410) after the loss of connectivity is detected. Specifically, the application 430 is made to stop issuing (sending) I/O requests, and execution of the application 430 is stopped gracefully rather than abruptly. That is, for example, the execution is halted at a suitable stopping point or checkpoint where database transactions are completed and data can be saved, and execution can be restarted without having to recover either the application or the data. Execution of the application 430' on the second node 245 can therefore continue at the point where execution on the first node 240 ended.

Thus, I/O shipping is used to satisfy the I/O requests until the application on the first node 240 can be gracefully shut down and the application on the second node 245 can be started, thereby avoiding the need for database or application recovery.

Figure 6A:
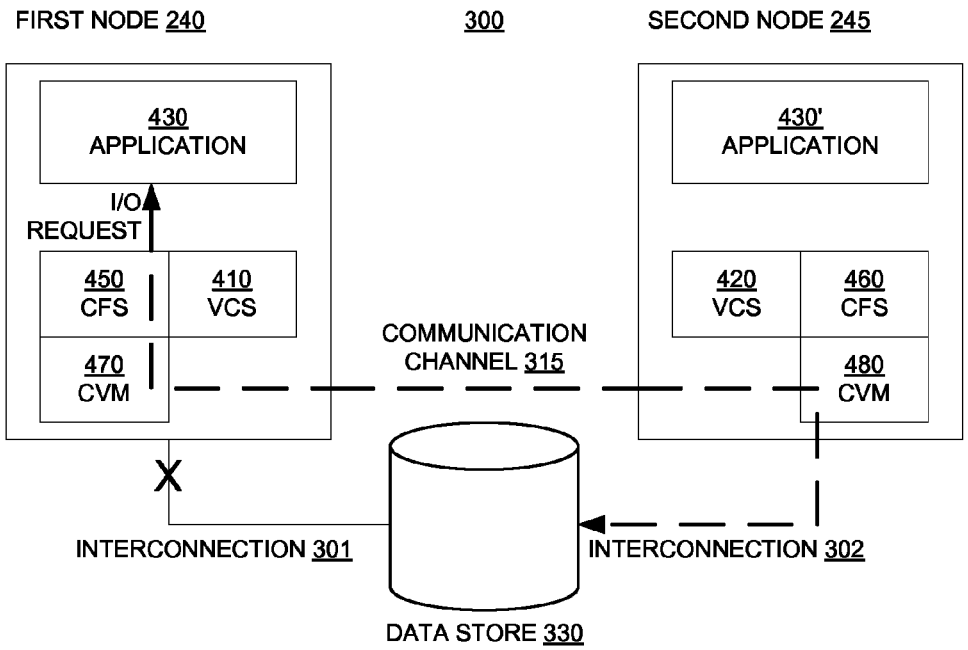
FIGS. 6A and 6B are block diagrams illustrating a response to loss of data store connectivity in another embodiment according to the present disclosure.
Figure 6B:
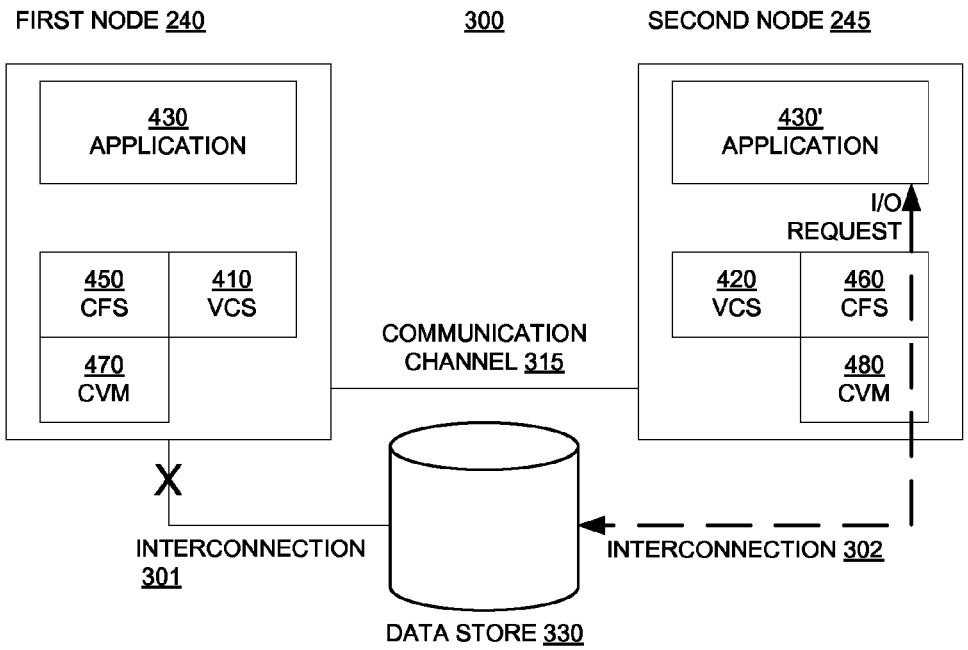

FIGS. 6A and 6B are block diagrams illustrating the technique described in conjunction with FIG. 4, but in an implementation in which the application 430 (430') is available in parallel. Initially, the application 430 (430') is executing in parallel on each of the nodes 240 and 245 as shown in FIG. 4. That is, the application 430 (430') can run simultaneously on each of the nodes 240 and 245.

In the embodiment of FIG. 6A, connectivity to the data store 330 is lost. Consequently, I/O shipping starts—any I/O requests are shipped (transferred) from the first node 240 to the second node 245 and the cluster software is notified about the loss of connectivity as previously described herein.

In the embodiment of FIG. 6B, after the loss of connectivity is detected, the application 430 is made to stop issuing (sending) I/O requests and the execution of the application 430 on the first node 240 is stopped gracefully (e.g., by the cluster manager 410). The application 430' continues to execute on the second node 245.

In either of the implementations just described, a system/storage administrator can be notified about the loss of connectivity (e.g., by the cluster manager 410). If the administrator is able to resolve the connectivity issue, then execution of the application 430 can begin again on the first node 240.

As mentioned above, the application 430 may be any type of application. In one embodiment, the application 430 is a virtual machine. In such an embodiment, upon detecting a loss of storage connectivity, the affected I/O domain (e.g., ESX, Hyper-V) can use its network connection to reroute requests through another domain that has connectivity. That is, the affected domain can use I/O shipping to route requests to another domain. The affected I/O domain can report the loss of connectivity to the virtual machine manager (e.g., vCenter). In response, the virtual machine manager can migrate the virtual machine from the affected I/O domain to another (e.g., to another server) using a virtual machine migration technique provided by the virtualization technology.

Figure 7:
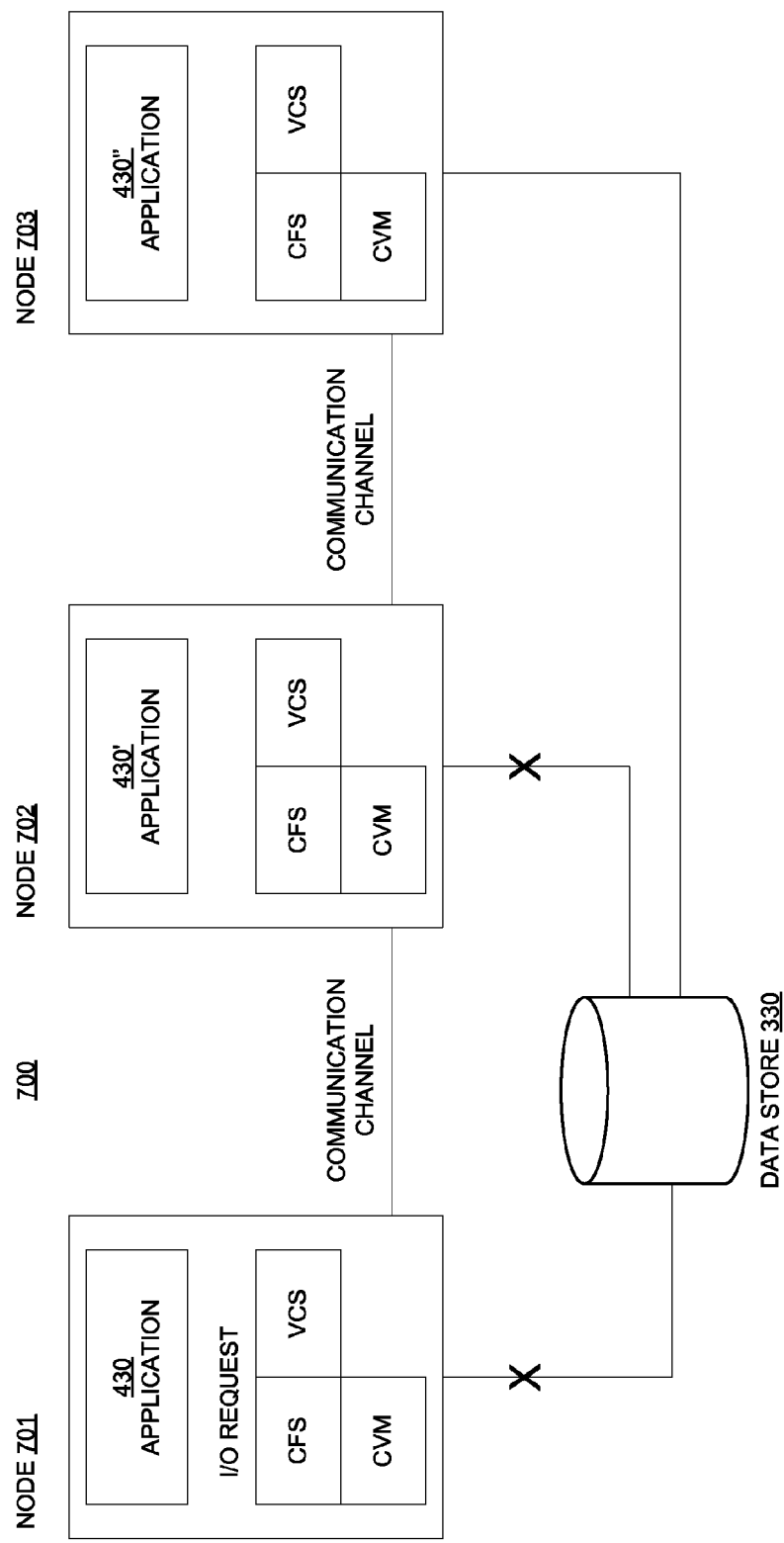
FIG. 7 is a block diagram illustrating an example of an approach for selecting a node in an embodiment according to the present disclosure.

FIG. 7 is a block diagram illustrating an approach for intelligently selecting a node for I/O shipping in an embodiment according to the present disclosure. In the example of FIG. 7, the cluster 700 includes three nodes 701, 702, and 703. The CVM on each of the nodes 701, 702, and 703 publishes its storage connectivity information, which is available to the cluster software. In the event of loss of connectivity, the cluster software is able to identify a node that still has connectivity. In the example of FIG. 7, the cluster software is able to identify that the node 703 still has connectivity, while the node 702 does not. Thus, if the node 701 loses connectivity to the data store 330, I/O shipping utilizes the node 703 to satisfy I/O requests, and execution of the application 430 (430") is transferred to the node 703 as previously described herein.

Figure 8:
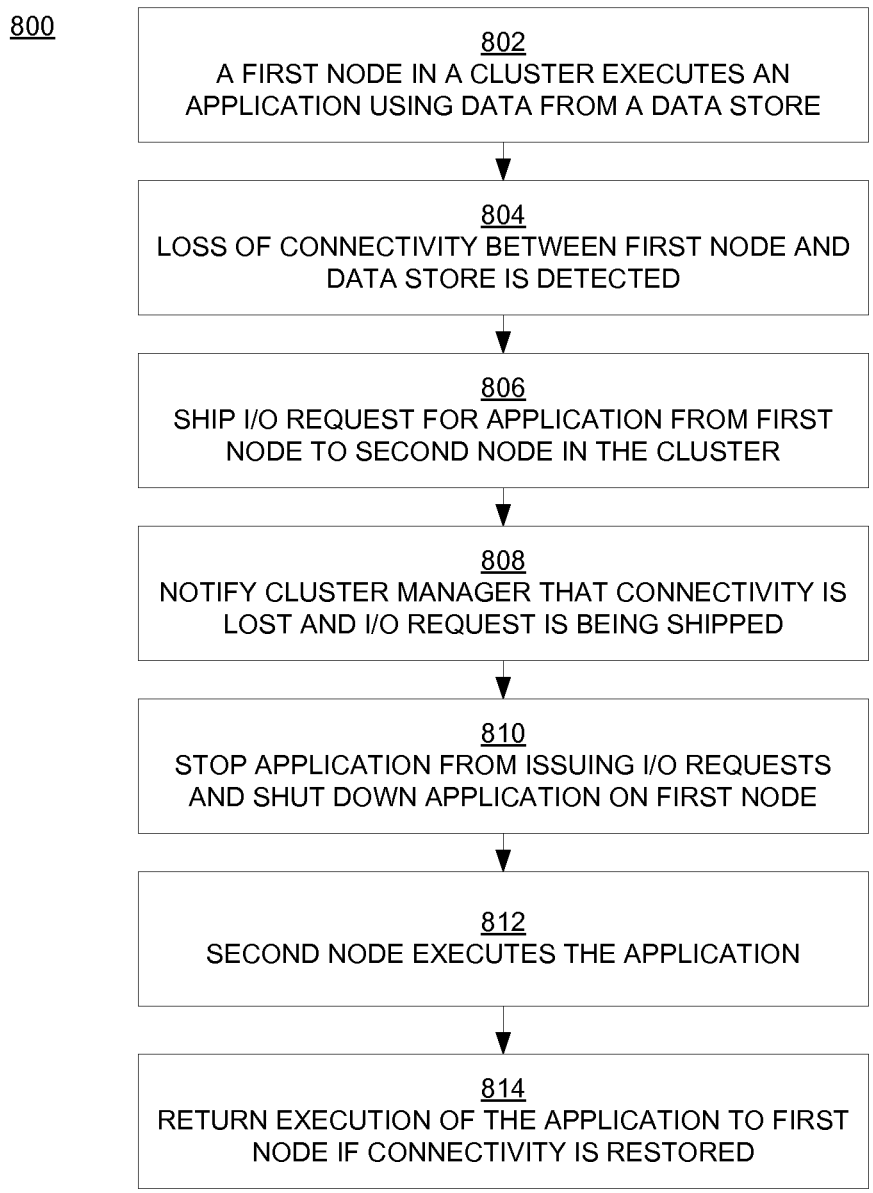
FIG. 8 is a flowchart of an example of computer-implemented operations performed in response to loss of data store connectivity in embodiments according to the present disclosure.

FIG. 8 is a flowchart 800 of an example of a computer-implemented method for using I/O shipping in response to a loss of connectivity in an embodiment according to the present disclosure. The flowchart 800 can be implemented as computer-executable instructions residing on some form of non-transitory computer-readable storage medium (e.g., using computing system 110 of FIG. 1).

In block 802 of FIG. 8, in one embodiment, a first node (e.g., a server) in a cluster is executing an application using data accessed from a data store.

In block 804, a loss of connectivity with the data store is detected.

In block 806, after the loss of connectivity is detected, an I/O request associated with the application is shipped from the first node to a second node in the cluster that is in communication with the first node and that is also in communication with the data store.

In one embodiment, to select the second node, connectivity status information for the nodes in the cluster is monitored. The second node is intelligently selected based on the connectivity status information. That is, the second node is selected because the status information identifies that the second node is able to access the data store.

In block 808, in one embodiment, a cluster manager/cluster manager agent executed by cluster software is notified that connectivity between the first node and the data store is lost and that the I/O request is being shipped to the second node.

In block 810, at a suitable point, the application is stopped from issuing I/O requests and execution of the application on the first node can be gracefully shut down.

In block 812, the second node can execute the application and satisfy the I/O request. In an embodiment in which parallel applications are executed on the first node and the second node, the application is shut down on the first node and executed on the second node. In another embodiment, the application is failed over from the first node to the second node. In either situation, the application can be gracefully shut down on the first node.

In block 814, if connectivity between the first node and the data store is restored, execution of the application can be returned to the first node.

In summary, when node (server) loses access to the storage in a server cluster environment, the cluster software is prevented from rebooting the node by providing continued storage access to the node using I/O shipping until existing database transactions are completed. Any database instances on the node can be prevented from crashing by using I/O shipping to access data disks. To prevent I/O shipping from affecting performance, the application on the affected node is gracefully shut down at a suitable point by, for example, having the CVM send a notification to the cluster software when I/O shipping is started. The cluster software can then shut down the database instance gracefully. This will prevent any service disruptions to clients. Additionally, the graceful application shutdown means that it is not necessary to undertake recovery of the shutdown database, reducing or eliminating the blackout time.

Thus, embodiments according to the present disclosure avoid the need to recover an application and/or data and reduce blackout time by using I/O shipping when a node (e.g., server) loses access to the data needed for the application and by gracefully shutting down the application on that node. Furthermore, embodiments according to the present disclosure improve overall performance by reducing the effect of the loss of connectivity, because the executing node can communicate directly with the data store.

While the foregoing disclosure sets forth various embodiments using specific block diagrams, flowcharts, and examples, each block diagram component, flowchart step, operation, and/or component described and/or illustrated herein may be implemented, individually and/or collectively, using a wide range of hardware, software, or firmware (or any combination thereof) configurations. In addition, any disclosure of components contained within other components should be considered as examples because many other architectures can be implemented to achieve the same functionality.

The process parameters and sequence of steps described and/or illustrated herein are given by way of example only and can be varied as desired. For example, while the steps illustrated and/or described herein may be shown or discussed in a particular order, these steps do not necessarily need to be performed in the order illustrated or discussed. The various example methods described and/or illustrated herein may also omit one or more of the steps described or illustrated herein or include additional steps in addition to those disclosed.

While various embodiments have been described and/or illustrated herein in the context of fully functional computing systems, one or more of these example embodiments may be distributed as a program product in a variety of forms, regardless of the particular type of computer-readable media used to actually carry out the distribution. The embodiments disclosed herein may also be implemented using software modules that perform certain tasks. These software modules may include script, batch, or other executable files that may be stored on a computer-readable storage medium or in a computing system. These software modules may configure a computing system to perform one or more of the example embodiments disclosed herein. One or more of the software modules disclosed herein may be implemented in a cloud computing environment. Cloud computing environments may provide various services and applications via the Internet. These cloud-based services (e.g., software as a service, platform as a service, infrastructure as a service, etc.) may be accessible through a Web browser or other remote interface. Various functions described herein may be provided through a remote desktop environment or any other cloud-based computing environment.

The foregoing description, for purpose of explanation, has been described with reference to specific embodiments. However, the illustrative discussions above are not intended to be exhaustive or to limit the invention to the precise forms disclosed. Many modifications and variations are possible in view of the above teachings. The embodiments were chosen and described in order to best explain the principles of the invention and its practical applications, to thereby enable others skilled in the art to best utilize the invention and various embodiments with various modifications as may be suited to the particular use contemplated.

Embodiments according to the invention are thus described. While the present disclosure has been described in particular embodiments, it should be appreciated that the invention should not be construed as limited by such embodiments, but rather construed according to the below claims.

What is claimed is:

1. A non-transitory computer-readable storage medium having computer-executable instructions that, when executed, cause a computer system to perform a method comprising:
   detecting, via a network connectivity status component, a loss of connectivity at a first time between a first node in a cluster of nodes and a data store, said first node comprising a server executing an application using data accessed from said data store, wherein said detecting is performed by said first node;
   subsequent to said detecting, communicating, via a cluster network communication channel, an input/output (I/O) request associated with said application from said first node to a second node in said cluster that is in communication with said first node and that is also in communication with said data store, wherein said I/O request is further communicated by said second node to said data store between said first time and a second subsequent time to permit indirect communication of said I/O request from said first node to said data store while avoiding a connection associated with said loss of connectivity, wherein said second subsequent time occurs at a predetermined threshold time after said first time that has been specifically determined for said application; and
   causing said application on said first node to stop issuing I/O requests after said second subsequent time, wherein said second subsequent time occurs after all I/O requests pending at said first time have been shipped.

2. The computer-readable storage medium of claim 1 wherein said method further comprises notifying a cluster manager executed by cluster software that said connectivity is lost and that said I/O request is being shipped to said second node.

3. The computer-readable storage medium of claim 1 wherein said method further comprises shutting down said application on said first node but not shutting down said application on other nodes in said cluster.

4. The computer-readable storage medium of claim 1 wherein said method further comprises failing over said application from said first node to said second node.

5. The computer-readable storage medium of claim 1 wherein said method further comprises returning execution of said application to said first node if said connectivity is restored.

6. The computer-readable storage medium of claim 1 wherein said application comprises a virtual machine.

7. The computer-readable storage medium of claim 1 wherein said method further comprises:
   monitoring connectivity status information for a plurality of nodes in said cluster; and
   selecting said second node from said plurality of nodes based on said connectivity status information.

8. A system comprising:
   a processor;
   a communication interface coupled to said processor and operable for communicating with a plurality of servers in a server cluster; and
   memory coupled to said processor and having stored therein instructions that, if executed by said system, cause said system to perform operations comprising:
      executing an application on a first node comprising a server using data accessed from a data store;
      detecting, via a network connectivity status component, loss of connectivity at a first time to said data store, wherein said detecting is performed by said first node;
      receiving an input/output (I/O) request associated with said application at said first node; and
      after said detecting, communicating, via a cluster network communication channel, said I/O request to a server in said server cluster that is in communication with said data store,
      wherein said I/O request is further communicated to said data store by said server in said server cluster that is in communication with said data store to permit indirect communication of said I/O request from said first node to said data store while avoiding a connection associated with said loss of connectivity between said first time and a second subsequent time, wherein said second subsequent time occurs at a predetermined threshold time after said first time that has been specifically determined for said application, and wherein subsequent execution of said application occurs on said server instead of said system after said second subsequent time, wherein said second subsequent time occurs after all I/O requests pending at said first time have been shipped.

9. The system of claim 8 wherein said method further comprises notifying a cluster manager executed by cluster software that said connectivity is lost and that said I/O request is being shipped to said server.

10. The system of claim 8 wherein said method further comprises shutting down execution of said application on said system.

11. The system of claim 8 wherein said method further comprises failing over execution of said application from said system to said server.

12. The system of claim 8 wherein said method further comprises returning execution of said application to said system if said connectivity is restored.

13. The system of claim 8 wherein said application comprises a virtual machine.

14. The system of claim 8 wherein said method further comprises:

monitoring connectivity status information for said plurality of servers in said server cluster; and selecting said server from said plurality of servers based on said connectivity status information.

15. A computer-implemented method comprising:

determining, via a network connectivity status component, that a first node comprising a server in a cluster of nodes is unable to access a data store at a first time, said first node executing an application using data from said data store, wherein said determining is performed by said first node;

receiving, at said first node, an input/output (I/O) request associated with said application;

after said determining, communicating, via a cluster network communication channel, said I/O request from said first node to a second node in said cluster that is in communication with said first node and that is able to access said data store, wherein said I/O request is further communicated by said second node to said data store between said first time and a second subsequent time to permit indirect communication of said I/O request from said first node to said data store while avoiding a connection associated with said loss of connectivity; and wherein said second node is operable to execute said application in lieu of executing said application on said first node after said second subsequent time, wherein said second subsequent time occurs at a predetermined threshold time after said first time that has been specifically determined for said application, wherein said second subsequent time occurs after all I/O requests pending at said first time have been shipped.

16. The method of claim 15 further comprising shutting down said application on said first node.

17. The method of claim 15 further comprising failing over said application from said first node to said second node.

18. The method of claim 15 further comprising returning execution of said application to said first node if connectivity between said first node and said data store is established.

19. The method of claim 15 wherein said application comprises a virtual machine.

20. The method of claim 15 further comprising:

monitoring connectivity status information for a plurality of nodes in said cluster; and selecting said second node from said plurality of nodes based on said connectivity status information.

* * * * *